United States Patent
Behmenburg et al.

(10) Patent No.: US 7,213,799 B2
(45) Date of Patent: *May 8, 2007

(54) PNEUMATIC SUSPENSION AND DAMPING ARRANGEMENT

(75) Inventors: Christof Behmenburg, Lauenau (DE);
Heinz Job, Neustadt (DE); Michael Märtens, Frankfurt am Main (DE);
Volker Härtel, Germering (DE);
Gerald Huber, Hannover (DE); Armin Kilsch, Hannover (DE); Thomas Engelke, Hannover (DE); Burkhard Kott, Hannover (DE)

(73) Assignee: Continental Aktiengesellschaft, Hannover (DE)

(*) Notice: Subject to any disclaimer, the term of this patent is extended or adjusted under 35 U.S.C. 154(b) by 113 days.

This patent is subject to a terminal disclaimer.

(21) Appl. No.: 10/386,520

(22) Filed: Mar. 13, 2003

(65) Prior Publication Data

US 2003/0173723 A1 Sep. 18, 2003

(30) Foreign Application Priority Data

Mar. 13, 2002 (EP) .................................. 02005722
Nov. 23, 2002 (EP) .................................. 02026122

(51) Int. Cl.
*F16F 9/04* (2006.01)
(52) U.S. Cl. .................... 267/64.24; 267/64.22
(58) Field of Classification Search .. 267/64.16–64.28, 267/256
See application file for complete search history.

(56) References Cited

U.S. PATENT DOCUMENTS

| | | | | |
|---|---|---|---|---|
| 1,538,420 A | * | 5/1925 | Church | ................... 267/64.24 |
| 3,168,278 A | * | 2/1965 | Ogden | ........................ 248/542 |
| 4,325,541 A | * | 4/1982 | Korosladanyi et al. | ..... 267/220 |
| 4,741,517 A | * | 5/1988 | Warmuth et al. | ........ 267/64.24 |
| 4,854,555 A | * | 8/1989 | Ohkawa et al. | .......... 267/64.24 |
| 2004/0201146 A1 | * | 10/2004 | Behmenburg et al. | ... 267/64.11 |

FOREIGN PATENT DOCUMENTS

| | | |
|---|---|---|
| DE | 24 06 835 | 8/1975 |
| DE | 10009212 A1 * | 9/2001 |
| EP | 0 516 129 | 12/1994 |

* cited by examiner

*Primary Examiner*—Xuan Lan Nguyen
(74) *Attorney, Agent, or Firm*—Walter Ottesen

(57) ABSTRACT

A pneumatic suspension and damping arrangement (100) is fixedly mounted on the chassis at the upper region and to the wheel mount at the lower region thereof. The arrangement includes two hermetically closed air springs (101, 102) filled with pressurized gas, whose volumes can be changed and which are connected via an air connection (134) to a pressurized gas source. The air springs are each enclosed by a movable wall formed by a flexible member (116, 124) and each roll off on a roll-off contour and are connected to each other via a throttle element (108) through which the gas can flow in two directions. The air springs are arranged one above the other and the roll-off contour of the first air spring (101) is defined in such a way by the second air spring (102) that the first air spring (101) rolls off on the second air spring (102). A connecting element of the upper cover (104) with the roll-off piston (128) of the second air spring (102) runs outside of the two air springs (101, 102).

36 Claims, 7 Drawing Sheets

Fig. 7
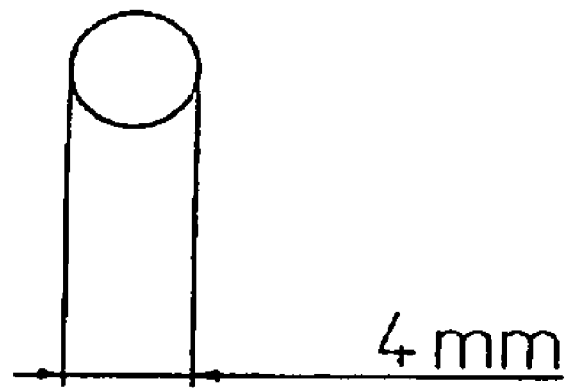
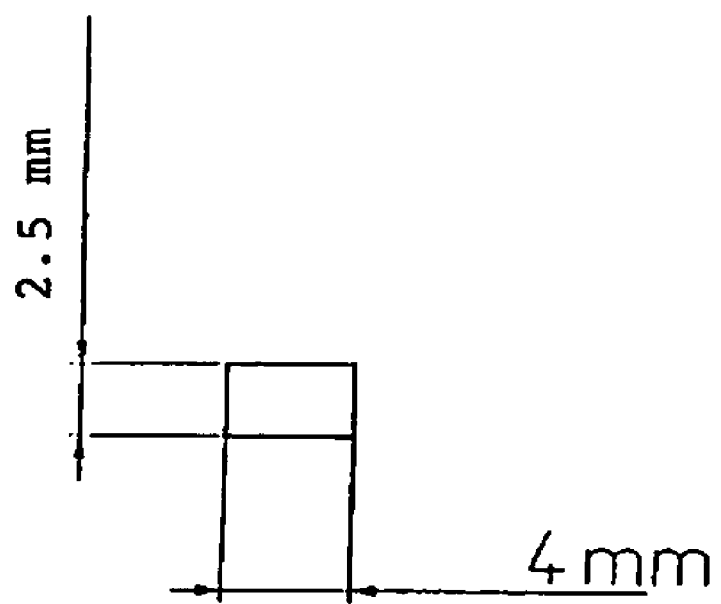

PNEUMATIC SUSPENSION AND DAMPING ARRANGEMENT

FIELD OF THE INVENTION

The invention relates to a pneumatic suspension and damping arrangement, especially for vehicles, which can preferably be fixedly mounted on the chassis in the upper area and to a wheel mount in the lower area. The pneumatic suspension and damping arrangement includes at least two hermetically closed air springs filled with compressed gas, whose volumes can be changed and which can be connected via an air connection to a compressed gas source. The air springs each include a movable wall formed by a flexible member and roll off on a roll-off contour and are connected via a throttle element through which a fluid such as air can flow in two directions. The air springs are arranged one above the other and the roll-off contour of the first air spring is predefined in such a way by the second air spring that the first air spring rolls off above the second air spring. An upper cover of the first air spring is connected via a connecting element to a roll-off piston of the second air spring, and a cover of the second air spring is connected to a mounting element.

BACKGROUND OF THE INVENTION

A pneumatic suspension and damping arrangement of the initially mentioned kind is known, for example, from U.S. Pat. No. 5,180,145. The arrangement for damping vibrations known from this publication can be operated between a suspension member fixed to the vehicle and a suspension member fixed to the wheel and utilizes an electrorheologic flow means as damping medium. The arrangement has a shorter axial height than the previously known suspension and damping arrangements. The shorter axial height is achieved by arranging two flow means chambers one above the other so that the roll-off contour of the first upper air spring is predefined by the outer contour of the second lower air spring. The flow means chambers are each tightly enclosed by elastic walls and form equally orientated rolling lobes and are connected to each other via a throttle element that air can flow through in both directions. An upper cover of the first upper flow means chamber is connected via a piston rod of the shock absorber to a roll-off piston of the second lower flow means chamber. A bumper is mounted on the roll-off piston of the second lower flow means chamber and this bumper is supported on a housing fixed to the wheel when the suspension and damping arrangement is almost completely deflected. The upper cover of the first upper flow means chamber, which is fixed to the chassis of the vehicle, has a volume compensating member, which is supported on the cover of the second lower flow means chamber when the suspension and damping arrangement is almost completely deflected. The cover of the second lower flow means chamber is connected via a housing provided with cutouts to a mounting bracket of a vehicle, which is fixed to the wheel. The pivotability of the suspension and damping arrangement of the end fixed to the chassis with respect to the end fixed to the wheel is relatively low since the pivot bearing of the suspension and damping arrangement cannot be configured as soft and elastic as desired. Because of the widely separated guiding elements and therefore very long guidance of the piston rod of the shock absorber of the suspension and damping arrangement, the arrangement is relatively long.

Furthermore, an undesirable friction occurs between these guiding elements and the piston rod, especially if additional transverse forces are present.

German patent publication 24 06 835 also describes a suspension and damping arrangement with air damping. In the suspension and damping arrangement known from this publication, a spring chamber, which decreases by means of a flexible member during deflection and which enlarges during rebounding, and a damper chamber, whose volume can be modified by means of a flexible member, are connected via a throttle element through which air can flow in both directions. The housing of the suspension and damping arrangement, which has an H-shaped cross section, is fixedly connected to the vehicle frame. The respective roll-off pistons of the suspension and damping chambers are supported against the respective upper and/or lower transverse control arms of the wheel mount. This embodiment of a suspension and damping arrangement with the housing having an H-shaped cross section leads to a complex configuration of the wheel mount, especially the fixed connection to the vehicle, and to an increased installation space requirement. This suspension and damping arrangement therefore cannot replace the conventional suspension and damping arrangements without special adaptations on the vehicle body with reference to the wheel mount, the fixed connection to the vehicle body and the installation space. The conventional suspension and damping arrangements include, for example, an air spring and a hydraulic shock absorber, which are usually fixedly mounted in the upper region on the vehicle body and in the lower region with a mounting device on a wheel mount.

SUMMARY OF THE INVENTION

It is an object of the invention to provide an arrangement suitable for a vehicle whose installation space is small and which can be installed without a greater structural complexity in the installation space of conventional suspension and damping arrangements. It is a further object of the invention that the arrangement has no (especially dry) friction, which can lead to acoustic problems.

The pneumatic suspension and damping arrangement of the invention includes: an upper cover; first and second air springs filled with pressurized gas and being mounted one above the other and each of the air springs being hermetically closed and changeable with respect to volume; a connector connectable to a source of pressurized gas for filling the air springs; a throttle element defining an interface between the respective interiors of the first and second air springs; the throttle element being configured to allow the pressurized gas to flow in both directions between the interiors; the first air spring including a first flexible resilient member having a first end attached to the upper cover; a lower cover; the second air spring including a second flexible resilient member having a first end attached to the lower cover; the lower cover defining a first roll-off piston for the first flexible resilient member and the lower cover being so configured that the first flexible resilient member rolls off over the second air spring; a second roll-off piston arranged below the lower cover; the second flexible member being connected to the second roll-off piston so as to roll off thereon; a connecting element connecting the upper cover to the second roll-off piston and extending down to the second roll-off piston outside of the first and second air springs; an attachment element diagnosed below the second air spring; and, the lower cover being connected to the attachment element.

A connecting element of the upper cover of the first air spring with the roll-off piston of the second air spring runs outside of the two air springs.

To install the suspension and damping arrangement in a vehicle, the first (upper) air spring is connected, for example, via an upper cover, to the chassis of the vehicle, whereas the second (lower) air spring is connected via a cover to a mounting element and is connected to the wheel mount of the vehicle. How this takes place will be explained step by step further below. When the first air spring rolls off over the second air spring, the two air springs must not necessarily make contact. The second air spring can almost dip into the first air spring when this first air spring rolls off over the second air spring, without the two air springs making contact. The advantage obtained with the invention is especially seen in that the arrangement of the air springs according to the invention can be built very short and compact and has no friction, because a shock absorber, which is usual in conventional suspension and damping arrangements, can be omitted. The attachment points of the upper cover and the mounting elements are advantageously configured in such a way that a conventional suspension and damping arrangement can be substituted with the suspension and damping arrangement according to the invention without great constructive modifications at the wheel mount or the vehicle body. Another advantage of the invention is that no undesirable friction especially by transverse forces is produced, which has an acoustically positive effect. The suspension and damping characteristics of the suspension and damping arrangement of the invention are therefore free of undesirable friction effects.

According to a further embodiment of the invention, a lower bell forms the outer contour of the lower flexible member of the second air spring and the roll-off contour of the upper flexible member of the first air spring. The comfort of a pneumatic suspension and damping arrangement depends essentially on the roll-off contour and the thickness of a flexible member. It is an advantage of the embodiment that the roll-off contour of the upper flexible member of the first air spring can be freely selected via the outer shaping of the lower bell and can thus be adjusted to an optimum comfort. Another advantage of this embodiment is that the outer guide contour of the lower flexible member of the second air spring allows a reduction of the thickness of this lower rolling lobe to an amount which is ideal for the comfort of the suspension and damping arrangement. Advantageously, the contour of the inner surface of the lower bell (outer guide contour of the lower flexible member of the second air spring) can be freely selected independently of the outer shape of the lower bell (roll-off contour of the upper flexible member of the lower air spring) and thus can be adapted optimally to the comfort of the suspension and damping arrangement.

According to a further embodiment of the invention, the lower bell is connected to the mounting element. This mounting element makes possible the connection of the suspension and damping arrangement of the invention to a conventional wheel mount of a vehicle. For this reason, no complex structural changes are necessary on the wheel mount of a vehicle for the installation of the suspension and damping arrangement of the invention.

According to a further embodiment of the invention, an upper bell represents an outer guide contour of the upper flexible member of the first air spring. The advantage of this embodiment is seen in that the outer guide contour of the upper flexible member of the first air spring allows a reduction of the thickness of this upper flexible member to an amount which is ideal for the comfort of the suspension and damping arrangement and permits a free shaping of this outer contour for an optimum comfort.

According to a further embodiment of the invention, a lower roll-off piston of the second air spring (which predefines the roll-off contour thereof) is connected to the upper bell. With this arrangement, in comparison with a conventional suspension and damping arrangement, a shock absorber can be omitted which is used conventionally for accommodating and attaching the piston of an air spring and connects the upper cover to the lower roll-off piston of the second air spring.

Another advantage of this embodiment is that both air springs can be orientated in the same direction and this saves installation space.

According to a further embodiment of the invention, an (upper) cover of the first air spring and the upper bell are configured as one part. The reduction of the number of components makes possible a simple and cost-effective design of the suspension and damping arrangement according to the invention. It is advantageous that in this embodiment of the invention the upper clamp ring of the upper end of the flexible member of the first air spring can lie within the first air spring and can press the upper end of the flexible member against the inner surface of the cover or the bell and can there form a seal. The upper clamp ring of the first air spring has therefore a sealing effect that is assisted by the air pressure of the air spring.

According to a further embodiment of the invention, the difference area between the areas of the roll-off contours of the two flexible members is small as an effective surface. A small effective surface of the roll-off contours allows the use of a relatively high air pressure in the air springs whereby a high bearing load, on the one hand, and a good axle damping in connection with a corresponding throttle element, on the other hand, can be achieved.

According to another embodiment of the invention, the lower roll-off piston is configured in two parts and contains an adaptation shell for forming the roll-off contour of the lower rolling lobe. With this adaptation shell, the roll-off contour of the lower flexible member of the second air spring can be adapted in a simple manner and without further structural or manufacturing complexity to the particular requirements as to suspension and damping of different vehicle types with different bearing loads.

According to a further embodiment of the invention, the first air spring can be pivoted with respect to the second air spring. A pivoting of the two air springs with respect to each other up to a predetermined angle $\alpha$ ((alpha)) does not have an appreciable influence on the function of the suspension and damping arrangement and does not generate additional friction or transverse forces, as is the case in conventional suspension and damping arrangements with a shock absorber and a piston rod. This has acoustic advantages. The center of rotation of the pivoting lies relatively far up in the center of the cover of the second lower air spring and the therefore long lever arm with reference to the lower mounting element permits a pivoting of the two air springs with respect to each other within a wide range. Another advantage of this embodiment of the invention is that no additional pivot bearing is necessary since the pivot bearing is already formed by the existing rolling lobes of the upper air spring.

According to a further embodiment of the invention, the flexible members of the two air springs are configured as one piece, especially of a tube-shaped flexible member. A separate seal, for example, via an O-ring, can be advantageously between the cover or the upper clamping ring of the second (lower) air spring and the lower bell. The elimination of the O-ring saves costs and production effort and improves the seal of the suspension and damping arrangement to the outside.

According to a further embodiment of the invention, the throttle element has a throttle cross section, which is selected preferably in the range between 0.2 Hz and 4 Hz with regard to an optimal damping of the frequency intrinsic to the vehicle body. The advantage of this embodiment is seen in that the frequency intrinsic to the vehicle body can be damped in a targeted manner without impermissibly hardening the suspension and damping arrangement especially at higher frequencies.

According to another embodiment of the invention, a connecting line is present between the two air springs. The advantage of this embodiment is that the suspension and damping arrangement can be adapted to the damping of another frequency. With the additional connecting line it is also possible to increase the overall damping performance. The damping performance is a measure of the quality of the damping properties of the suspension and damping arrangement. The greater the damping performance, the better the damping of the suspension and damping arrangement.

According to a further embodiment of the invention, the throttle element and the connecting line are connected in parallel between the two air springs. The advantage of this embodiment is that the suspension and damping arrangement can be adapted to the damping of another frequency. The throttle element and the connecting line can be optimally adapted to the installation conditions at different locations of the suspension and damping arrangement.

According to a further embodiment of the invention, the throttle element and the connecting line are connected in series between the two air springs. The advantage of this embodiment is seen in that a simple assembly is created with only one connection. The manufacturing costs can be reduced as a result of the use of the same components for both connections.

According to a further embodiment, the throttle element is arranged at one end of the connecting line between the two air springs either on or in the upper cover or the upper bell or on or in the lower roll-off piston. In this way, the throttle element is easily accessible from the outside and can be exchanged, if required, to adapt the suspension and damping arrangement to different vehicle types. It is another advantage of this embodiment that the (resonance) vibration behavior of the connection line is not influenced by the throttle element.

According to another embodiment of the invention, the throttle element is arranged within (preferably in the center) of the connecting line between the two air springs. The advantage of this embodiment is seen in that the connecting line between the two air springs can be adjusted to the damping of two specific frequencies. Thus, three specific frequencies can be damped in a targeted manner by the suspension and damping arrangement. The length of the connecting line of the two air springs can be doubled in this case, so that quasi two connecting lines, separated by a throttle element, are connected in series.

According to another embodiment of the invention, the connecting line between the two air springs runs outside of the two air springs. The advantage of this embodiment is seen in that the connection can be easily manufactured. Another advantage is that the connection is accessible from the outside, which facilitates significantly an integration of further components on or in the connection. Another advantage is that outside of the two air springs, especially in a connection which is long and large in cross section, a large installation space is available.

According to a further embodiment of the invention, the connecting line between the two air springs runs on or in the upper bell and/or on or in the lower roll-off piston. The advantage of this embodiment is seen in that the connection is easy to manufacture. The connection can be configured in the form of a standard hose line. Or the connection is formed by a channel within the upper bell and the lower roll-off piston.

According to a further embodiment of the invention, the connecting line can be switched between the two air springs with a switch unit and preferably a magnetic valve is used. The advantage of this embodiment is seen in that the suspension and damping arrangement with the switchability of the connecting line has two different suspension and damping characteristics, as is required, for example, in a first soft and comfort-oriented characteristic and a second hard sport characteristic.

According to a further embodiment of the invention, the connecting line between the two air springs can be controlled preferably continuously with an electrically actuable proportional valve. The advantage of this embodiment is that the suspension and damping characteristic of the suspension and damping arrangement can be continuously adapted to the particular desired driving mode. In this way, especially the damping properties of the arrangement can be optimally adjusted at each time point to the driving state of the motor vehicle.

According to a further embodiment of the invention, the switch unit of the connecting line between the two air springs is arranged on or in the upper bell. The advantage of this embodiment of the invention is seen in that the switch unit is easily accessible from the outside. Cost-effective standard components can be used for the switch unit. The control and current supply lines of the switch unit are also easily accessible.

According to a further embodiment of the invention, the switch unit of the connecting line is arranged between the two air springs on or in the lower roll-off piston. The advantage of this embodiment of the invention is seen in that the switch unit is easily accessible from the outside. Cost-effective standard components can be used for the switch unit. The control and current supply lines of the switch unit can also be easily accessed.

According to another embodiment of the invention, the connecting line has a large cross-sectional area of preferably more than 10 $mm^2$ compared to the throttle cross-sectional area of the throttle element. The advantage of this embodiment of the invention is seen in that the suspension and damping arrangement with a large cross-sectional area of the connecting line can dampen vehicle vibrations in a frequency range of above approximately 10 Hz.

According to a further embodiment of the invention, the length of the connecting line corresponds at least to the fivefold value of the cross-sectional area of the connecting line. The advantage of this embodiment of the invention is seen in that the resonance vibrations in the range of the vibrations of the vehicle axle can be damped in a targeted manner especially in a higher frequency range of more than 10 Hz. The shorter the length of the connecting line and the larger the cross-sectional area of the connecting line, the higher the frequencies that can be damped.

According to a further embodiment of the invention, the cross section and the length of the connecting line between the two air springs are so selected that a good damping of the axle vibrations (preferably in the frequency range between 10 Hz and 40 Hz) is achieved. The advantage of this embodiment of the invention is that a specific frequency (especially a resonance frequency) can be damped in a targeted manner with the connecting line between the two air springs. The cross section and the length are matched to each other in such a way that vibrations are imparted to the air column within the connecting line and these vibrations of the air column greatly increase the damping of the specific frequency.

According to a further embodiment of the invention, the cross-sectional area of the connecting line between the two air springs is selected in the range between 3 mm² and 500 mm² and the length of the connecting line between the two air springs is selected within the range of 50 mm and 1000 mm. The advantage of this embodiment is seen in that an especially good damping of the vehicle axle intrinsic or natural frequencies is possible within this range of cross-sectional area to length of the connecting line between the two air springs without hardening and thereby deteriorating the suspension properties of the arrangement at high frequencies.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
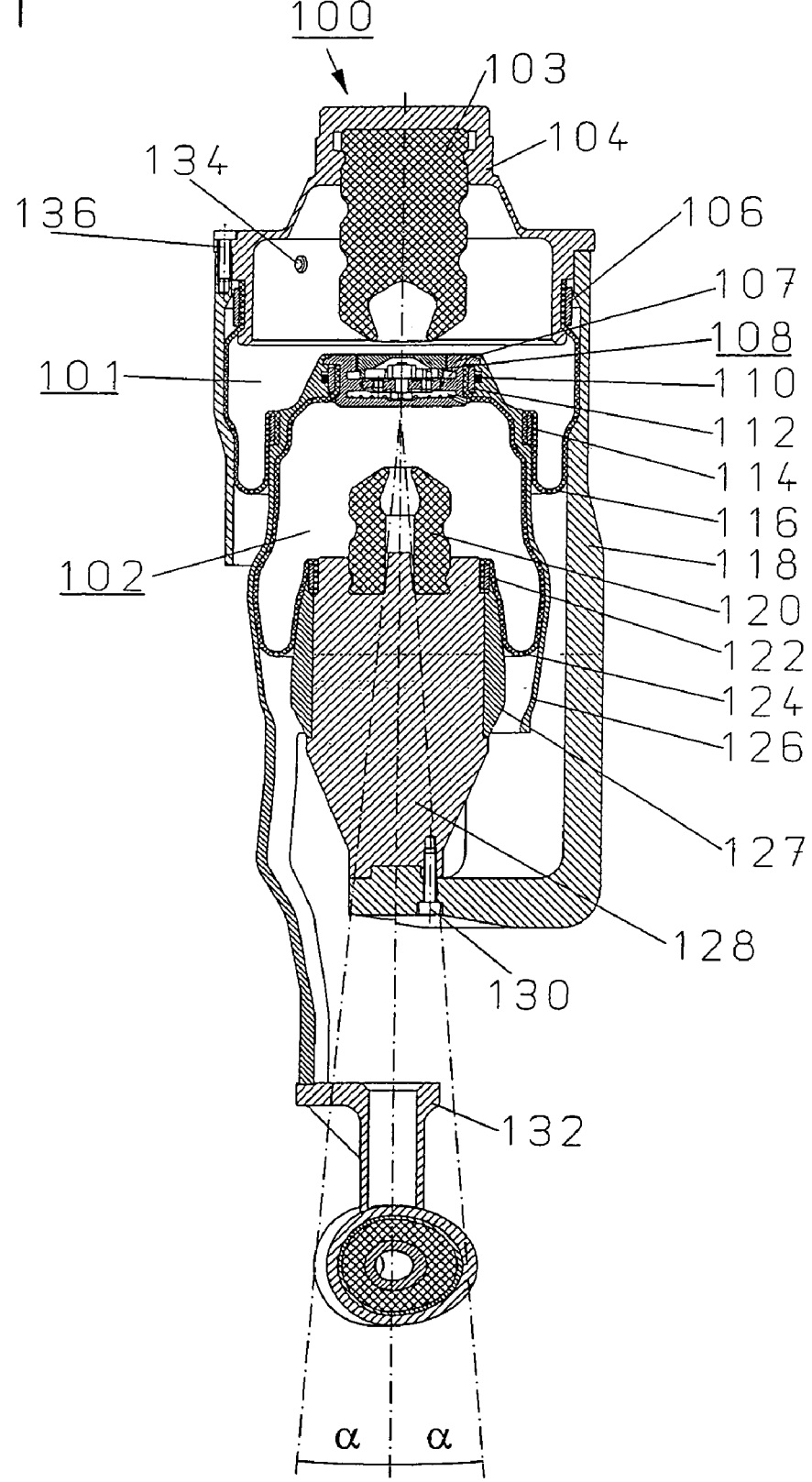
FIG. 1 shows a pneumatic suspension and damping arrangement.

FIG. 1 shows a suspension and damping arrangement having a first air spring 101 and a second air spring 102. The first air spring 101 is hermetically sealed to the outside via a flexible member 116 and rolls off forming a rolling lobe above the second air spring 102, which is also hermetically sealed to the outside via a flexible member 124. The two air springs (101, 102) are connected via a throttle element 108, through which air can flow in both directions. The throttle element 108 has one or several through-bores with one or several check valves per throughflow direction and determines therewith the possible damping performance of the suspension and damping arrangement 100.

The upper end of the flexible member 116 of the first air spring 101 is tightly connected via a clamp ring 106 to an upper cover 104 which comprises an ancillary spring 103 and an air connection 134. When the first air spring 101 is almost completely deflected, the ancillary spring 103 is supported on a lower cover 107 and/or on the throttle element 108 and has, as a consequence, an additional suspension and damping effect. The support of the ancillary spring 103 on the throttle element 108 can have as a consequence a partial or complete covering and thereby a closure of the through-bores or the check valve of the throttle element 108 and can thereby change the damping of the suspension and damping arrangement in, for example, a progressive manner.

Figure 2:
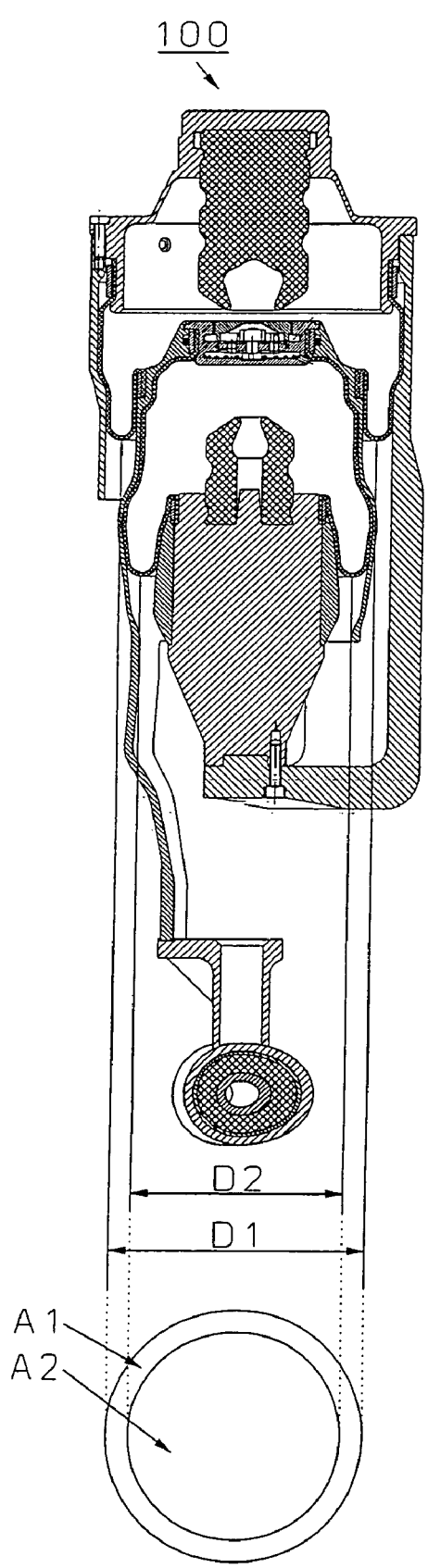
FIG. 2 shows a pneumatic suspension and damping arrangement and the effective areas thereof.

An upper bell 118 is mounted on the cover 104 with one or several screws 136. The connection can, however, also be welded or pressed or produced with another usual connection technique. According to another embodiment, the cover 104 of the first air spring 101 and upper bell 118 can be configured as one piece. The lower end of the upper flexible member 116 of the first air spring 101 is tightly connected via a clamp ring 114 to a cover 107 and/or a lower bell 126 while forming a rolling lobe. The bell 126 is connected in its lower area, which is extended at one end, to a mounting element 132. The mounting element 132 of FIGS. 1 and 2 is configured as a mounting lug. However, any other known configuration of a mounting element can be used. The connection of the cover 107 or the lower bell 126 to the mounting element 132 can be produced with a hook-shaped element or two symmetrically arranged hook-shaped elements or another usual connecting technique. The outer shape of the lower bell 126 predetermines the roll-off contour of the upper flexible member 116 of the first air spring 101 and the inner shape, independently from the outer shape, predetermines the outer guide contour of the lower flexible member 124 of the second air spring 102.

The cover 107, which accommodates the throttle element 108, is mounted in the upper area of the lower bell 126. The upper end of the lower flexible member 124 of the second air spring 102 is tightly connected to the cover 107 via a clamp ring 112. The connection between the clamp ring 112 and the bell 126 is tightly closed via an O-ring 110 lying between the above-mentioned components. The lower end of the lower flexible member 124 of the second air spring 102 is tightly connected via a clamp ring 122 to a roll-off piston 128 forming a rolling lobe. The roll-off piston 128 comprises an ancillary spring 120 and is mounted, for example, on an area of the upper bell 118 and/or of the upper cover 104, which is extended at one end, via one or several screws 130. The connection can also be welded or pressed or be made with another usual connecting technique. The connection of the cover 104 and/or the bell 118 to the roll-off piston 128 can be made via a hook-shaped element or two or more symmetrically or asymmetrically arranged elements or another usual connecting technique. The ancillary spring 120 is supported on the lower cover 107 and/or the throttle element 108 when the second air spring 102 is almost completely deflected and has, as a consequence, an additional suspension and damping effect. The support of the ancillary spring 120 on the throttle element 108 can have, as a consequence, a partial or complete covering and thereby a closure of the through-bores or the check valve of the throttle element 108 and can thereby change the damping of the suspension and damping arrangement 100 in, for example, a progressive manner.

An adaptation shell 127 of plastic, rubber or metal, which predetermines the roll-off contour of the lower flexible member 124 of the second air spring 102, is pressed, clamped or glued on the roll-off piston 128. The following can be pivoted with respect to each other by an angle α (alpha): the air spring 101 to the air spring 102 or the upper bell 118 to the lower bell 126 or the cover 104, which is fixedly attached to the chassis of the vehicle, to the lower mounting element 132.

FIG. 2 shows a suspension and damping arrangement 100 of the type initially mentioned herein. The effective diameters (D1, D2) of the two air springs are formed by a tangent, which lies perpendicular with respect to the vertical axis of the suspension and damping arrangement on the lower rolling lobe. The effective surface A1 of the first air spring results from the effective diameter D1 thereof and the effective surface A2 of the second air spring results from the effective diameter D2 of the latter. The difference surface of the effective surfaces A1 and A2 is preferably small.

Figure 3:
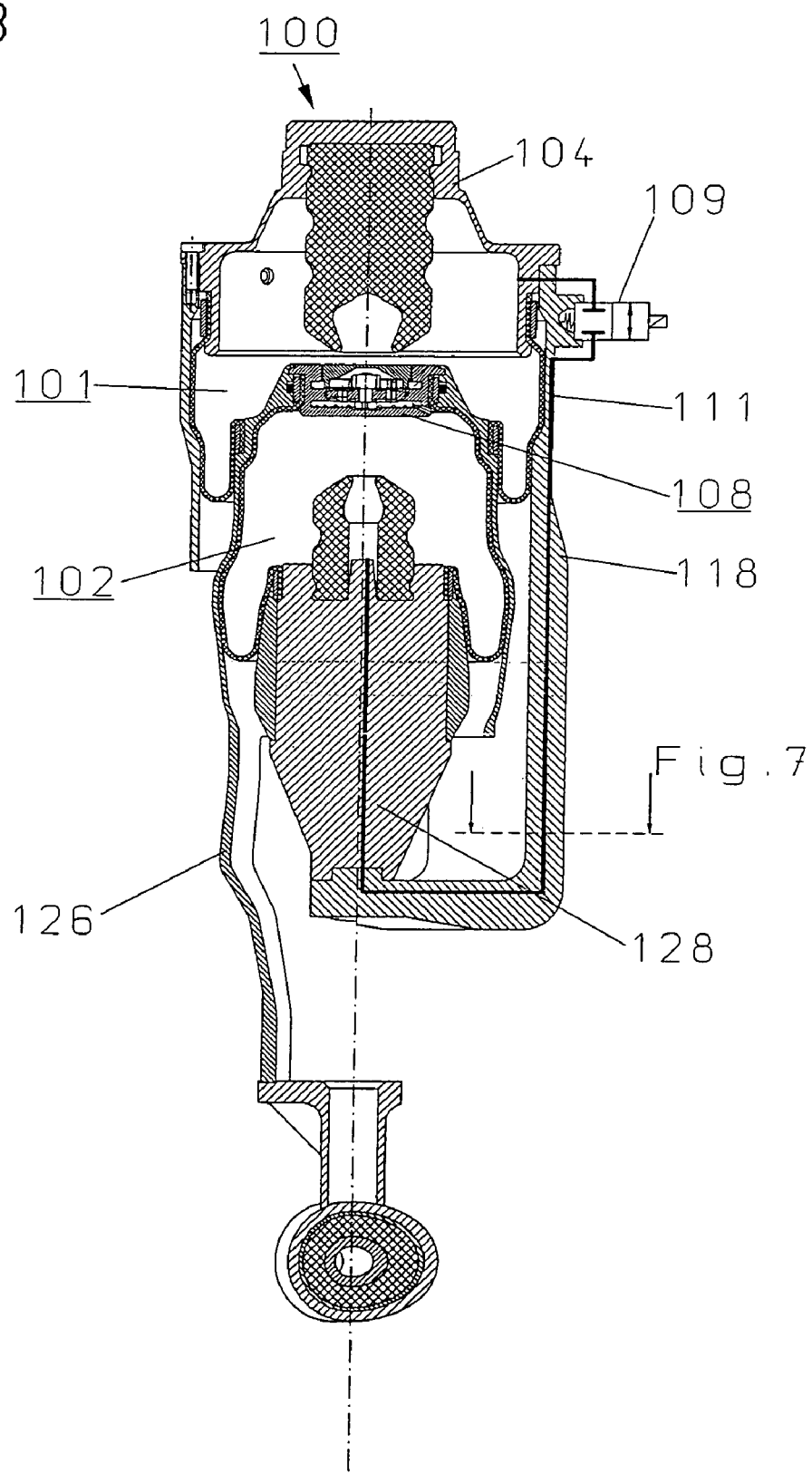
FIGS. 3 to 6 show different embodiments of the pneumatic suspension and damping arrangement of the invention; and, FIG. 7 shows the cross-sectional area of the connecting line.

FIG. 3 shows a suspension and damping arrangement 100 of the type initially mentioned herein. A connecting line 111 between the two air springs 101 and 102 is arranged outside of the two air springs (101, 102) on or in the upper bell 118 and in the lower roll-off piston 128, as well as parallel to the throttle element 108 which is mounted in the upper region of the lower bell 126. The throttle element 108 has a throttle cross section of approximately 0.8 mm² (not shown) so that an optimal damping of the frequency intrinsic to the design of the vehicle of approximately 1 Hz is achieved. The length of the connecting line 111 corresponds to more than fivefold the value of the cross section of the connecting line 111 shown in FIG. 7. A switch unit 109 is fixedly connected in the region of the cover 104 to the upper bell 118 and can interrupt the connecting line 111 in a first switching position (as shown) or clear the same in a second switching position. The switch unit 109 is represented as an electrically operable 2/2-directional valve in this exemplary embodiment. However, other actuating means can also be used as switch unit 109.

Outside of the upper bell 118, the connecting line 111 is arranged in the region of the switch unit 109 by means of a standard pneumatic hose with corresponding standard connecting elements to the upper bell 118 and the switch unit 109. Otherwise, the connecting line 111 is defined completely within the cover 104, the upper bell 118 and the lower roll-off piston 128 by through bores, casting channels or the like so that the connecting line is protected from damage from the outside. However, it is also possible to manufacture the connecting line exclusively of a standard pneumatic line with corresponding standard connecting elements, so that no complex deep bores or long, narrow casting channels or the like must be produced.

The seal of the connecting line 111 between the individual components: cover 104, upper bell 118 and/or lower roll-off piston 128 can be produced, for example, in the form of connections via plugs, bores, pressing or adhesive or the like. Or a sealing ring or a flat seal is arranged between the corresponding components. Another possibility for producing the connecting line 111 comprises introducing bores from outside into the corresponding components and sealing off and locking these bores to the outside via a conventional closure technique, such as, for example, by forcing balls or the like into place. The connecting line 111 can, as shown in FIG. 4, be placed completely within the cover 104, the upper bell 118 and the lower roll-off piston 128.

Figure 4:
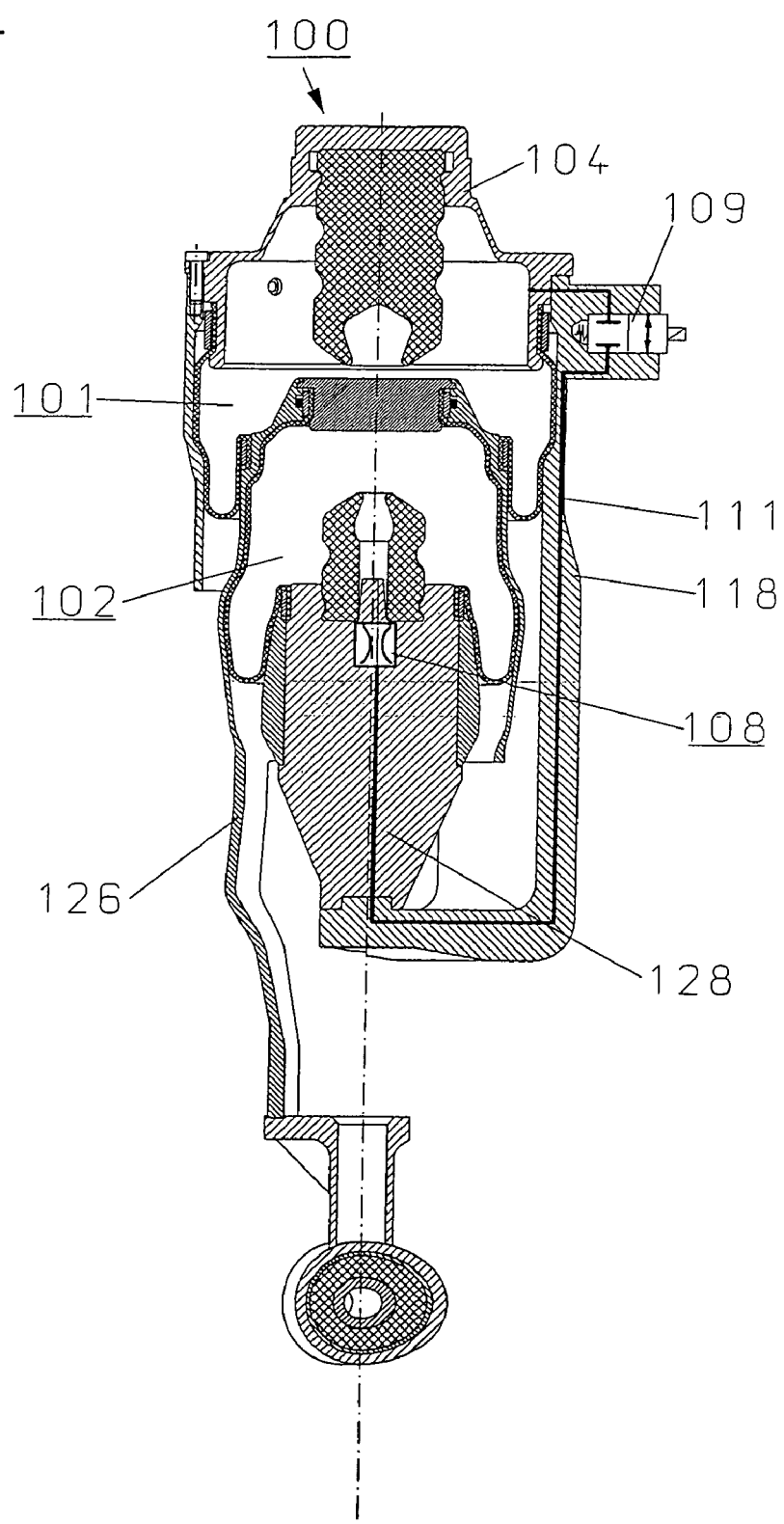

FIG. 4 shows a suspension and damping arrangement 100 of the type initially mentioned herein and differs from FIG. 3 in that the throttle element 108 is connected in series with the connecting line 111. The throttle element 108 is arranged in the lower roll-off piston 128 at one end of the connecting line 111 of the two air springs (101, 102). The connecting line 111 is guided in this exemplary embodiment (as also in FIG. 3) outside of the two air springs (101, 102). However, it is also possible that the connecting line 111 is arranged on or in the upper region of the lower bell 126 and in series with the throttle element 108.

Figure 5:
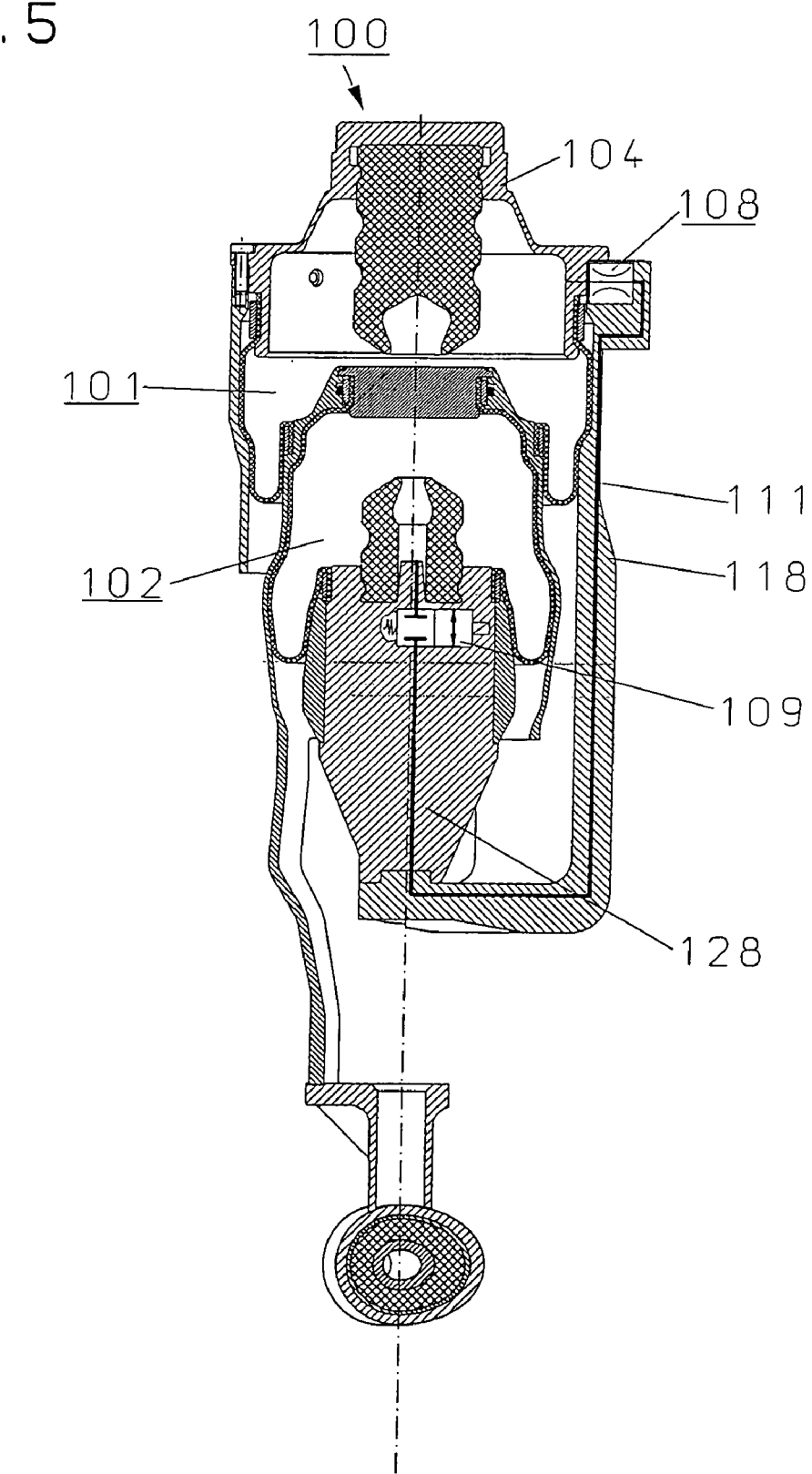

FIG. 5 shows a suspension and damping arrangement 100 of the kind initially mentioned herein and differs from FIG. 4 in that the throttle element 108 is arranged on or in the upper bell 118 or the cover 104 at one end of the connecting line 111 and the switch unit 109 is arranged in the lower roll-off piston 128 at the other end of the connecting line 111.

Figure 6:
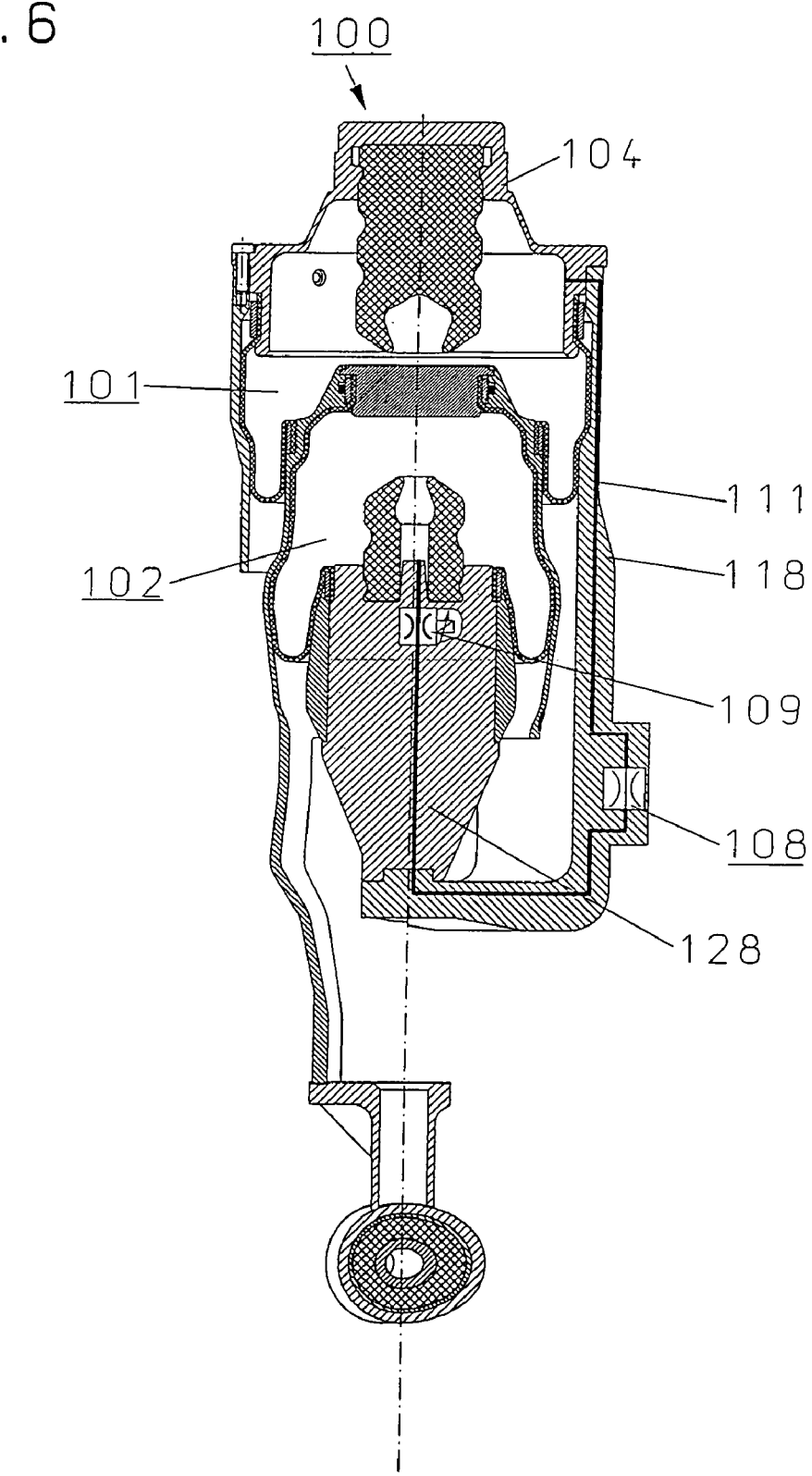

FIG. 6 shows a suspension and damping arrangement 100 of the type initially mentioned herein and differs from FIG. 5 in that the throttle element 108 is arranged on or in the upper bell 118 within the connecting line 111, preferably in the center of the connecting line 111. The switch unit 109 is placed in the lower roll-off piston 128 at one end of the connecting line 111. In this embodiment, the switch unit 109 is configured as an electrically operable proportional valve. However, all other conventional valves, for example, pneumatic or hydraulic or similar valves, which can be continuously controlled, can also be used as switch unit 109.

FIG. 7 shows the cross-sectional area of the connecting line 111. The cross-sectional area can be, as shown, circular or rectangular. The cross-sectional area has a minimum area of more than 10 mm² so that the diameter of a circular cross section is greater than 4 mm. For a rectangular cross-sectional area of at least 10 mm², for example, side lengths of at least 2.5 mm or at least 4 mm are indicated. The side lengths can be selected as desired. Likewise, any desired form of a cross-sectional area is conceivable, for example, an elliptical form, when the minimum cross-sectional area amounts to 10 mm².

It is understood that the foregoing description is that of the preferred embodiments of the invention and that various changes and modifications may be made thereto without departing from the spirit and scope of the invention as defined in the appended claims.

What is claimed is:

1. A pneumatic suspension and damping arrangement for mounting in a motor vehicle having a chassis and a wheel mount, the arrangement comprising:

an upper cover attachable to said chassis;

first and second air springs filled with pressurized gas and being mounted one above the other and each of said air springs being hermetically closed and changeable with respect to volume;

a connector connectable to a source of pressurized gas for filling said air springs;

a throttle element defining an interface between the respective interiors of said first and second air springs;

said throttle element being configured to allow said pressurized gas to flow in both directions between said interiors;

said first air spring including a first flexible resilient member having a first end attached to said upper cover;

a lower cover;

said first flexible resilient member having a second end attached to said lower cover;

said second air spring including a second flexible resilient member having a first end attached to said lower cover;

said lower cover having a downwardly extending annular body having an outer wall surface and defining a first roll-off piston for said first flexible resilient member and said annular body being so configured that said first flexible resilient member rolls off over said second air spring on said outer wall surface;

a second roll-off piston arranged below said lower cover;

said second flexible resilient member being connected to said second roll-off piston so as to roll off thereon;

said annular body having an inner wall surface defining a guide contour for said second flexible resilient member;

said first and second flexible resilient members defining first and second rolling lobes, respectively, and said first and second rolling lobes rolling off on corresponding ones of said first and second roll-off pistons in the same direction;

a connecting element connecting said upper cover fixedly to said second roll-off piston and extending down to said second roll-off piston outside of said first and second air springs;

an attachment element rigidly connected to said lower cover and extending downwardly below said second air spring and said attachment element being rigidly connected to said wheel mount and being in spaced relationship to said connecting element so as not to be fixedly connected thereto; and, said first and second air springs enclosing respective first and second interior spaces devoid of any rigid structure interconnecting said air springs thereby permitting said first and second air springs to pivot with respect to each other when said wheel mount moves relative to said chassis during operation of said motor vehicle.

2. The arrangement of claim 1, said lower cover being configured as a lower bell defining an outer guide contour of said second flexible resilient member and the roll-off contour of said first flexible resilient member.

3. The arrangement of claim 2, wherein said lower bell is connected to said attachment element.

4. The arrangement of claim 2, wherein said second roll-off piston is configured as two parts and said second roll-off piston includes an adaptation shell for defining the roll-off contour of said second flexible resilient member.

5. The arrangement of claim 1, wherein the roll-off contours of said first and second air springs conjointly define a difference area acting as an effective area and said effective area is small.

6. The arrangement of claim 1, wherein said first air spring is pivotable relative to said second air spring.

7. The arrangement of claim 1, wherein each of said first and second flexible resilient members are configured as one piece.

8. The arrangement of claim 7, wherein said first and second flexible resilient members are configured as tubular flexible resilient members.

9. The arrangement of claim 1, wherein said arrangement is mounted in a motor vehicle including a vehicle body having a resonance frequency; and, said throttle element has a throttle cross section which is selected with respect to providing an optimal damping of said resonance frequency.

10. The arrangement of claim 9, wherein said throttle cross section is selected for a frequency in a range of 0.2 Hz to 4 Hz.

11. The arrangement of claim 1, further comprising a connecting line between said first and second air springs.

12. The arrangement of claim 11, wherein said throttle element and said connecting line are connected in parallel between said first and second air springs.

13. The arrangement of claim 11, wherein said throttle element and said connecting line are connected in series between said first and second air springs.

14. The arrangement of claim 13, further comprising an upper bell defining the outer guide contour of said first flexible resilient member of said first air spring; and, wherein said throttle element is disposed at one end of said connecting line and is mounted at one of the following locations: within or on said upper cover, on said upper bell and within or on said second roll-off piston.

15. The arrangement of claim 13, wherein the throttle element is mounted within said connecting line.

16. The arrangement of claim 15, wherein the throttle element is mounted at the center of said connecting line.

17. The arrangement of claim 11, wherein said connecting line runs between and outside of said first and second air springs.

18. The arrangement of claim 11, further comprising an upper bell defining the outer guide contour of said first flexible resilient member of said first air spring; and, wherein said connecting line runs between said first and second air springs at or in said upper bell and on or in said lower roll-off piston.

19. The arrangement of claim 11, further comprising a switchable valve switchable between a first position wherein said connecting line is interrupted and a second position wherein said connecting line is cleared.

20. The arrangement of claim 19, wherein said switch unit includes an electrically actuable magnetic valve.

21. The arrangement of claim 19, wherein the switch unit is mounted on or in said second roll-off piston.

22. The arrangement of claim 19, wherein said connecting line has a cross-sectional area which is large compared to the cross-sectional area of the throttle of said throttle element.

23. The arrangement of claim 22, wherein said cross-sectional area of said connecting line is more than 10 $mm^2$.

24. The arrangement of claim 11, further comprising a proportional valve disposed in said connecting line.

25. The arrangement of claim 24, wherein said proportional valve is an electrically proportional valve which can be continuously controlled.

26. The arrangement of claim 24, further comprising an upper bell defining the outer guide contour of said first flexible resilient member of said first air spring; and, said switch unit being mounted in or on the upper bell.

27. The arrangement of claim 11, wherein the length of said connecting line corresponds to at least five times the value of the cross-sectional area of said connecting line.

28. The arrangement of claim 11, wherein said connecting line has a cross-sectional area lying in the range of 10 $mm^2$ to 500 $mm^2$ and the length of said connecting line lies in the range of 50 mm to 1000 mm.

29. The arrangement of claim 11, wherein the cross-sectional area and the length of said connecting line are so selected that a good damping of the axle frequencies is achieved.

30. The arrangement of claim 29, wherein said axle frequencies lie in the range of 10 Hz to 40 Hz.

31. The arrangement of claim 1, further comprising an ancillary spring disposed in one of said first and second interior spaces to coact with said throttle element to provide a change of the damping of said first and second air springs during operation of said pneumatic suspension and damping arrangement; and, an upper bell disposed in surrounding relationship to said first flexible member so as to define an outer guide contour for said first flexible member.

32. The arrangement of claim 31, wherein said ancillary spring is a first ancillary spring mounted in said first interior space; and, wherein said arrangement further comprises a second ancillary spring mounted in said second interior space to also coact with said throttle element to provide a change of the damping of said first and second air springs during operation of said pneumatic suspension and damping arrangement.

33. The arrangement of claim 32, wherein said first ancillary spring is mounted on said upper cover and said second ancillary spring is mounted on said second roll-off piston.

34. A pneumatic suspension and damping arrangement for mounting in a motor vehicle having a chassis and a wheel mount, the arrangement comprising:

an upper cover attachable to said chassis;

first and second air springs filled with pressurized gas and being mounted one above the other and each of said air springs being hermetically closed and changeable with respect to volume;

a connector connectable to a source of pressurized gas for filling said air springs;

a throttle element defining an interface between the respective interiors of said first and second air springs;

said throttle element being configured to allow said pressurized gas to flow in both directions between said interiors;

said first air spring including a first flexible resilient member having a first end attached to said upper cover;

a lower cover;

said first flexible resilient member having a second end attached to said lower cover;

said second air spring including a second flexible resilient member having a first end attached to said lower cover;

said lower cover defining a first roll-off piston for said first flexible resilient member and said lower cover being so configured that said first flexible resilient member rolls off over said second air spring;

a second roll-off piston arranged below said lower cover;

said second flexible resilient member being connected to said second roll-off piston so as to roll off thereon;

said first and second flexible resilient members defining first and second rolling lobes, respectively, and said first and second rolling lobes rolling off on corresponding ones of said first and second roll-off pistons in the same direction;

a connecting element connecting said upper cover fixedly to said second roll-off piston and extending down to said second roll-off piston outside of said first and second air springs;

an attachment element fixedly connected to said lower cover and extending downwardly below said second air spring and said attachment element being connected to said wheel mount and being in spaced relationship to said connecting element so as not to be fixedly connected thereto;

said first and second air springs enclosing respective first and second interior spaces devoid of any rigid structure interconnecting said air springs thereby permitting said first and second air springs to pivot with respect to each other when said wheel mount moves relative to said chassis during operation of said motor vehicle; and, an upper bell made of rigid material and connected to said upper cover and extending downwardly in surrounding relationship to said first roll-off piston to permit said first roll-off piston to move telescopically within said upper bell and so as to permit said upper bell to define an outer guide contour of said first flexible resilient member.

35. The arrangement of claim 34, wherein said upper cover and the upper bell are configured as one piece.

36. The arrangement of claim 34, wherein said connecting element is connected to said upper cover via said upper bell.

\* \* \* \* \*